(12) United States Patent
Gilbertson et al.

(10) Patent No.: US 11,699,107 B2
(45) Date of Patent: Jul. 11, 2023

(54) DEMOGRAPHIC-AWARE FEDERATED MACHINE LEARNING

(71) Applicant: Optum, Inc., Minnetonka, MN (US)

(72) Inventors: Thomas R. Gilbertson, Hartford, CT (US); Matthew R. Versaggi, Eden Prairie, MN (US); Gregory J. Boss, Eden Prairie, MN (US)

(73) Assignee: Optum, Inc., Minnetonka, MN (US)

( * ) Notice: Subject to any disclaimer, the term of this patent is extended or adjusted under 35 U.S.C. 154(b) by 651 days.

(21) Appl. No.: 16/792,650

(22) Filed: Feb. 17, 2020

(65) Prior Publication Data

US 2021/0256429 A1    Aug. 19, 2021

(51) Int. Cl.
*G06N 20/20* (2019.01)
*G06N 3/08* (2023.01)
*G06N 7/01* (2023.01)

(52) U.S. Cl.
CPC .............. *G06N 20/20* (2019.01); *G06N 3/08* (2013.01); *G06N 7/01* (2023.01)

(58) Field of Classification Search
CPC .......... G06N 20/20; G06N 3/08; G06N 7/005; G06N 20/00; G06N 3/0454
USPC .......................................................... 706/12
See application file for complete search history.

(56) References Cited

U.S. PATENT DOCUMENTS

| | | | |
|---|---|---|---|
| 2017/0220949 A1* | 8/2017 | Feng | H04L 41/16 |
| 2018/0322606 A1* | 11/2018 | Das | G06T 1/60 |
| 2018/0342323 A1* | 11/2018 | Shankar | G16H 10/60 |
| 2020/0160171 A1* | 5/2020 | Rangarajan | G06N 3/08 |
| 2021/0174257 A1* | 6/2021 | Pothula | G06F 16/27 |

OTHER PUBLICATIONS

Huang Li et al.: "Patient clustering improves efficiency of federated machine learning to predict mortality and hospital stay time using distributed electronic medical records" (Year: 2019).*
Yurochkin et al. "Bayesian Nonparametric Federated Learning of Neural Networks" (Year: 2019).*

(Continued)

*Primary Examiner* — Bhavesh M Mehta
*Assistant Examiner* — Darioush Agahi
(74) *Attorney, Agent, or Firm* — Alston & Bird LLP

(57) ABSTRACT

There is a need for more effective and efficient predictive data analysis. This need can be addressed by, for example, solutions for performing/executing demographic-aware federated machine learning. In one example, a method includes receiving local machine learning model data objects from model data object provider agents; for each inference-profile pair that is associated with a corresponding inference identifier and a corresponding model profile, generating a global machine learning model data object based at least in part on a related local model subset of the local machine learning model data objects for the inference-profile pair; and providing, based at least in part on each global machine learning model data object, a demographic-aware predictive data analysis application programming interface (API), wherein the demographic-aware predictive data analysis API is accessible by the model data object provider agents.

20 Claims, 10 Drawing Sheets

(56) References Cited

OTHER PUBLICATIONS

International Searching Authority, International Search Report and Written Opinion for International Application No. PCT/US2021/016506, dated May 28, 2021, (15 pages), European Patent Office, Rijswijk, Netherlands.

Brisimi, Theodora S. et al. "Federated Learning of Predictive Models From Federated Electronic Health Records," International Journal of Medical Informatics, Apr. 2018, vol. 112, (22 pages). DOI: 10.1016/j.ijmedinf.2018.01.007.

Choudhury, Olivia et al. "Differential Privacy-Enabled Federated Learning For Sensitive Health Data," arXiv preprint arXiv:1910.02578, Oct. 7, 2019, (6 pages), XP081532108. arXiv.org, Cornell University Library, 201 Olin Library Cornell University, Ithaca, NY.

International Searching Authority, International Search Report and Written Opinion for International Application No. PCT/US2021/016506, dated Feb. 4, 2021, (15 pages), European Patent Office, Rijswijk, Netherlands.

Liu et al. "FADL: Federated-Autonomous Deep Learning For Distributed Electronic Health Record," arXiv preprint arXiv:1811.11400v1, Nov. 28, 2018, (5 pages), XP081000384. arXiv.org, Cornell University Library, 201 Olin Library, Cornell University, Ithaca, NY.

Xu, Jie et al. "Federated Learning For Healthcare Informatics," arXiv reprint arXiv: 1911.06270v1, Nov. 13, 2019, (5 pages), XP081532683. arXiv.org, Cornell University Library, 201 Olin Library Cornell University, Ithaca, NY.

Huang, Li et al. "Patient Clustering Improves Efficiency Of Federated Machine Learning To Predict Mortality and Hospital Stay Time Using Distributed Electronic Medical Records," Journal of Biomedical Informatics, vol. 99, Nov. 2019, (21 pages).

Leetaru, Kalev. "How Federated Learning Combined With Gamification Could Restore Privacy To AI Training," Forbes, Jul. 31, 2019, (5 pages). [Retrieved From The Internet Apr. 30, 2020] <https://www.forbes.com/sites/kalevleetaru/2019/07/31/how-federated-learning-combined-with-gamification-could-restore-privacy-to-ai-training/#36fa5ffe210b>.

Liang, Paul Pu et al. "Think Locally, Act Globally: Federated Learning with Local and Global Representations," arXiv:2001.01523, Feb. 28, 2020, (21 pages).

Yurochkin, Mikhail et al. "Bayesian Nonparametric Federated Learning Of Neural Networks," arXiv:1905.12022v1, May 28, 2019, (15 pages).

* cited by examiner

DEMOGRAPHIC-AWARE FEDERATED MACHINE LEARNING

BACKGROUND

Various embodiments of the present invention address technical challenges related to performing predictive data analysis. Various embodiments of the present invention address the shortcomings of existing predictive inference systems and disclose various techniques for efficiently and reliably performing predictive data analysis.

BRIEF SUMMARY

In general, embodiments of the present invention provide methods, apparatus, systems, computing devices, computing entities, and/or the like for performing cross-demographic-aware federated machine learning. Certain embodiments utilize systems, methods, and computer program products that perform cross-demographic federated machine learning using at least one of model provider demographic profiles, inference identifiers, global machine learning models each associated with a corresponding model provider demographic profile and a corresponding inference identifier, demographic-aware predictive data analysis application programming interfaces (APIs), per-inference universal machine learning models, per-inference-per-profile machine learning models, and/or the like.

In accordance with one aspect, a method is provided. In one embodiment, the method comprises receiving a plurality of local machine learning model data objects from a plurality of model data object provider agents, wherein (i) each local machine learning model data object is received from a corresponding model data object provider agent of the plurality of model data object provider agents, (ii) each local machine learning model data object is associated with an inference identifier of one or more inference identifiers, and (iii) each local machine learning model data object is associated with at least one of one or more model provider demographic profiles; for each inference-profile pair of a plurality of inference-provider pairs that is associated with a corresponding inference identifier and a corresponding model profile of the one or more model provider demographic profiles, generating a global machine learning model data object of a plurality of global machine learning model data objects based at least in part on a related local model subset of the plurality of local machine learning model data objects for the inference-profile pair, wherein the related local model subset for an inference-profile pair comprises local machine learning model data objects that are associated with the corresponding inference identifier for the inference-profile pair and the corresponding model provider profile for the inference-profile pair; and providing, based at least in part on the plurality of global machine learning model data objects, a demographic-aware predictive data analysis application programming interface (API), wherein the demographic-aware predictive data analysis API is accessible by the plurality of model data object provider agents.

In accordance with another aspect, a computer program product is provided. The computer program product may comprise at least one computer-readable storage medium having computer-readable program code portions stored therein, the computer-readable program code portions comprising executable portions configured to receive a plurality of local machine learning model data objects from a plurality of model data object provider agents, wherein (i) each local machine learning model data object is received from a corresponding model data object provider agent of the plurality of model data object provider agents, (ii) each local machine learning model data object is associated with an inference identifier of one or more inference identifiers, and (iii) each local machine learning model data object is associated with at least one of one or more model provider demographic profiles; for each inference-profile pair of a plurality of inference-provider pairs that is associated with a corresponding inference identifier and a corresponding model profile of the one or more model provider demographic profiles, generate a global machine learning model data object of a plurality of global machine learning model data objects based at least in part on a related local model subset of the plurality of local machine learning model data objects for the inference-profile pair, wherein the related local model subset for an inference-profile pair comprises local machine learning model data objects that are associated with the corresponding inference identifier for the inference-profile pair and the corresponding model provider profile for the inference-profile pair; and provide, based at least in part on the plurality of global machine learning model data objects, a demographic-aware predictive data analysis application programming interface (API), wherein the demographic-aware predictive data analysis API is accessible by the plurality of model data object provider agents.

In accordance with yet another aspect, an apparatus comprising at least one processor and at least one memory including computer program code is provided. In one embodiment, the at least one memory and the computer program code may be configured to, with the processor, cause the apparatus to receive a plurality of local machine learning model data objects from a plurality of model data object provider agents, wherein (i) each local machine learning model data object is received from a corresponding model data object provider agent of the plurality of model data object provider agents, (ii) each local machine learning model data object is associated with an inference identifier of one or more inference identifiers, and (iii) each local machine learning model data object is associated with at least one of one or more model provider demographic profiles; for each inference-profile pair of a plurality of inference-provider pairs that is associated with a corresponding inference identifier and a corresponding model profile of the one or more model provider demographic profiles, generate a global machine learning model data object of a plurality of global machine learning model data objects based at least in part on a related local model subset of the plurality of local machine learning model data objects for the inference-profile pair, wherein the related local model subset for an inference-profile pair comprises local machine learning model data objects that are associated with the corresponding inference identifier for the inference-profile pair and the corresponding model provider profile for the inference-profile pair; and provide, based at least in part on the plurality of global machine learning model data objects, a demographic-aware predictive data analysis application programming interface (API), wherein the demographic-aware predictive data analysis API is accessible by the plurality of model data object provider agents.

BRIEF DESCRIPTION OF THE DRAWINGS

Figure 1:
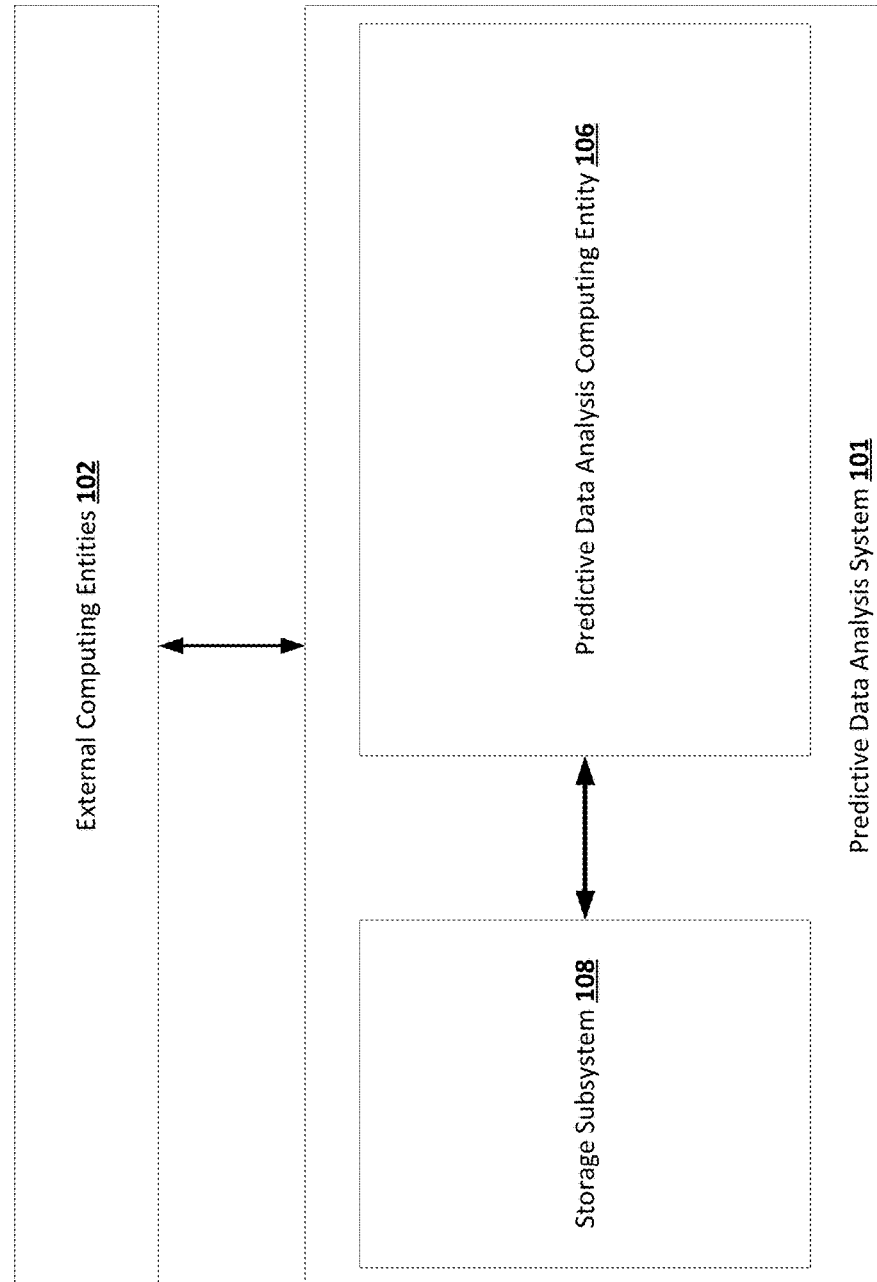

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
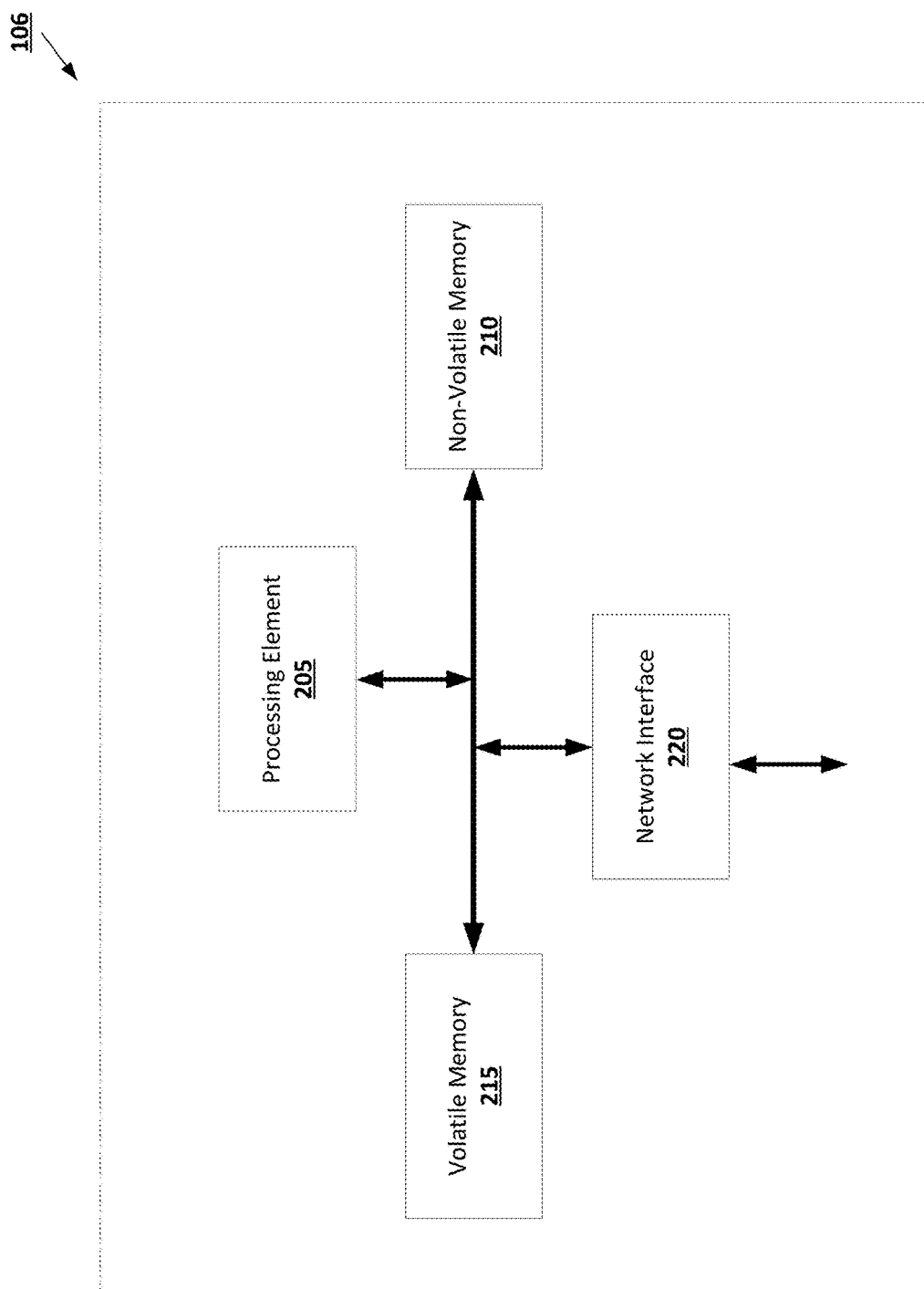

FIG. 2 provides an example predictive data analysis computing entity in accordance with some embodiments discussed herein.

Figure 3:
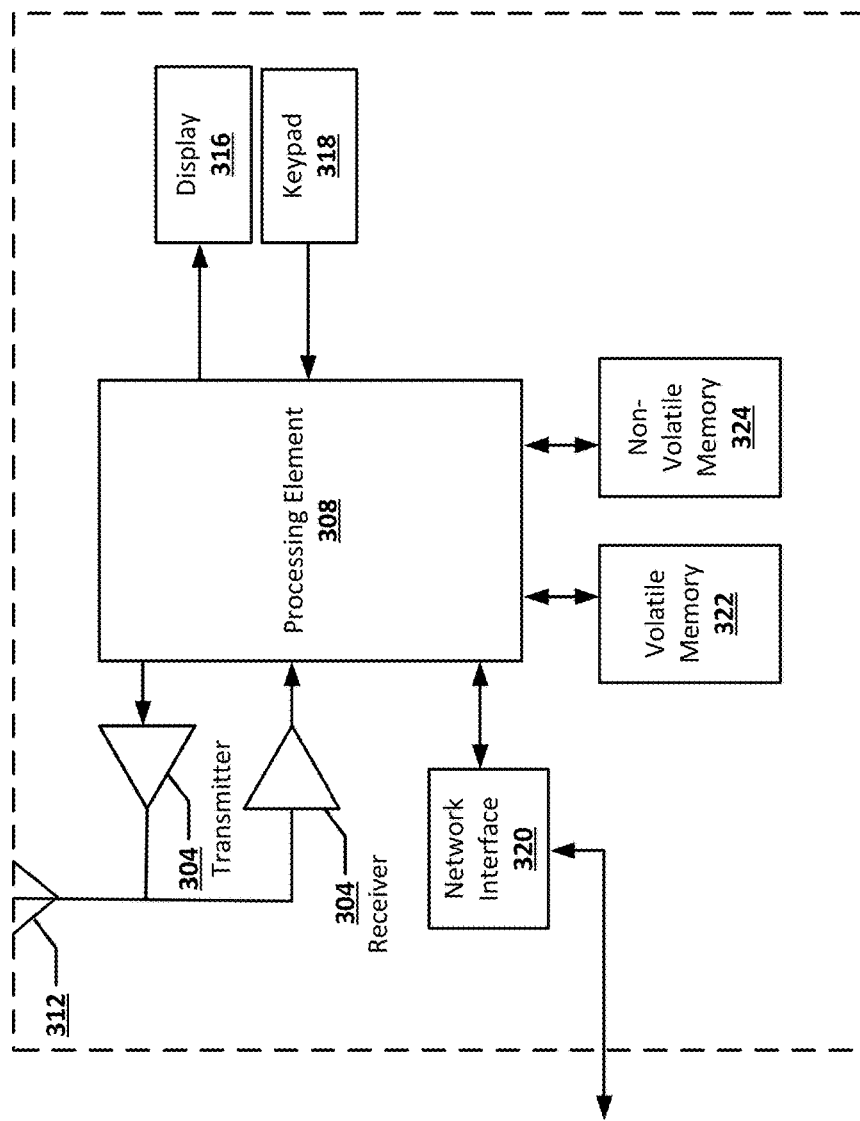

FIG. 3 provides an example external computing entity in accordance with some embodiments discussed herein.

Figure 4:
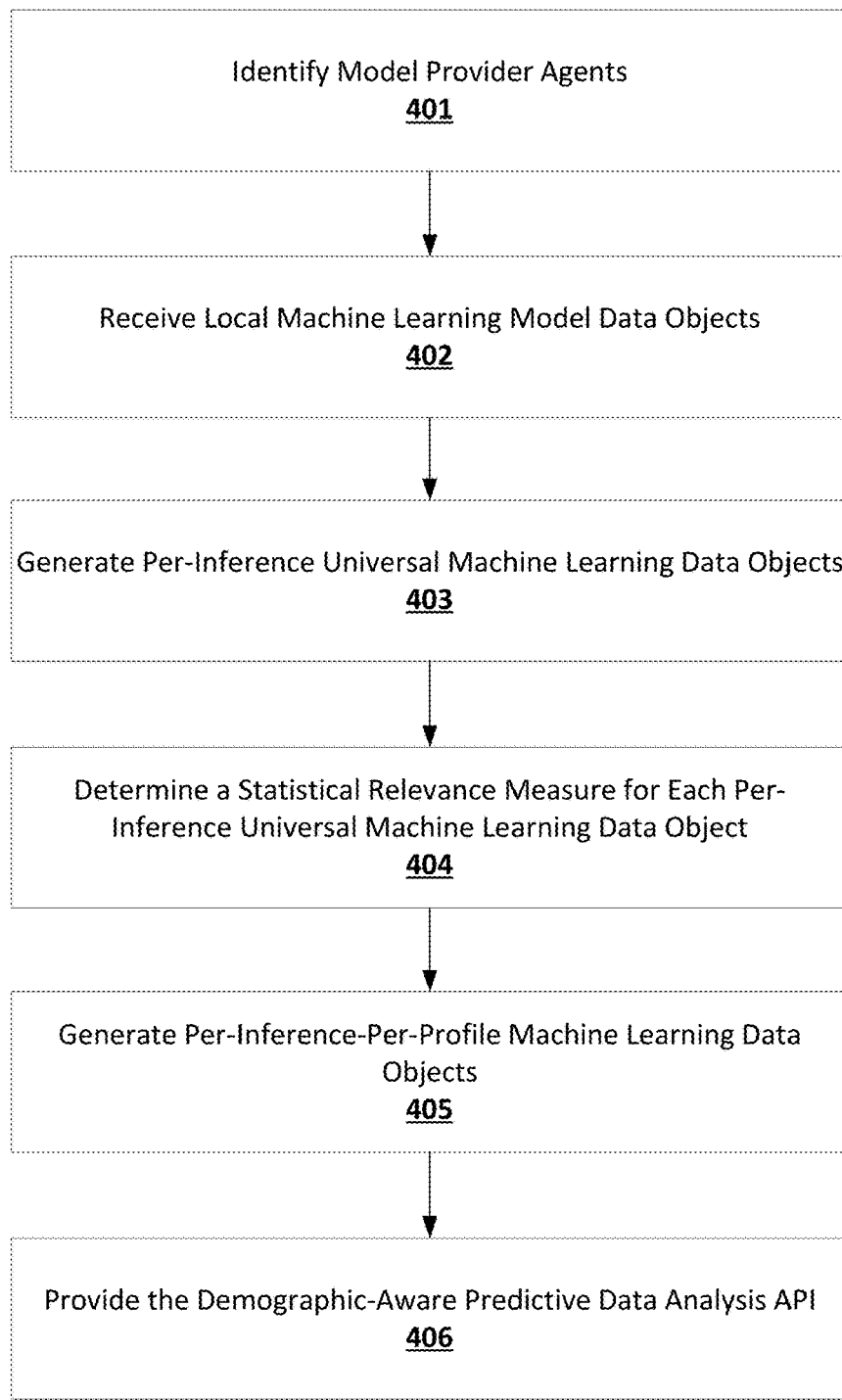

FIG. 4 is a flowchart diagram of an example process for performing demographic-aware federated machine learning in accordance with some embodiments discussed herein.

Figure 5:
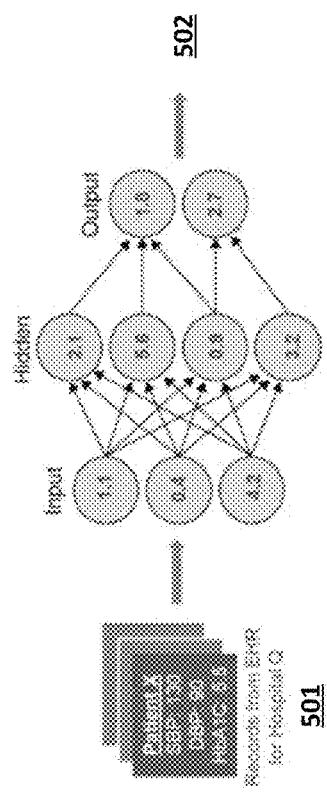

FIG. 5 provides an operational example of a neural network machine learning model in accordance with some embodiments discussed herein.

Figure 6:
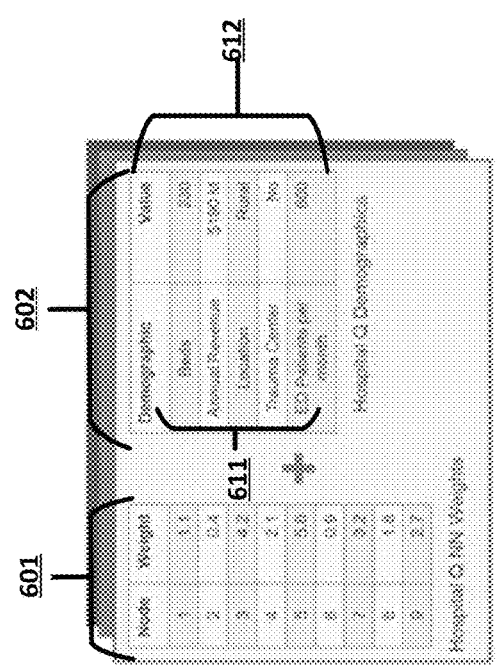

FIG. 6 provides an operational example of a local input data object in accordance with some embodiments discussed herein.

Figure 7:
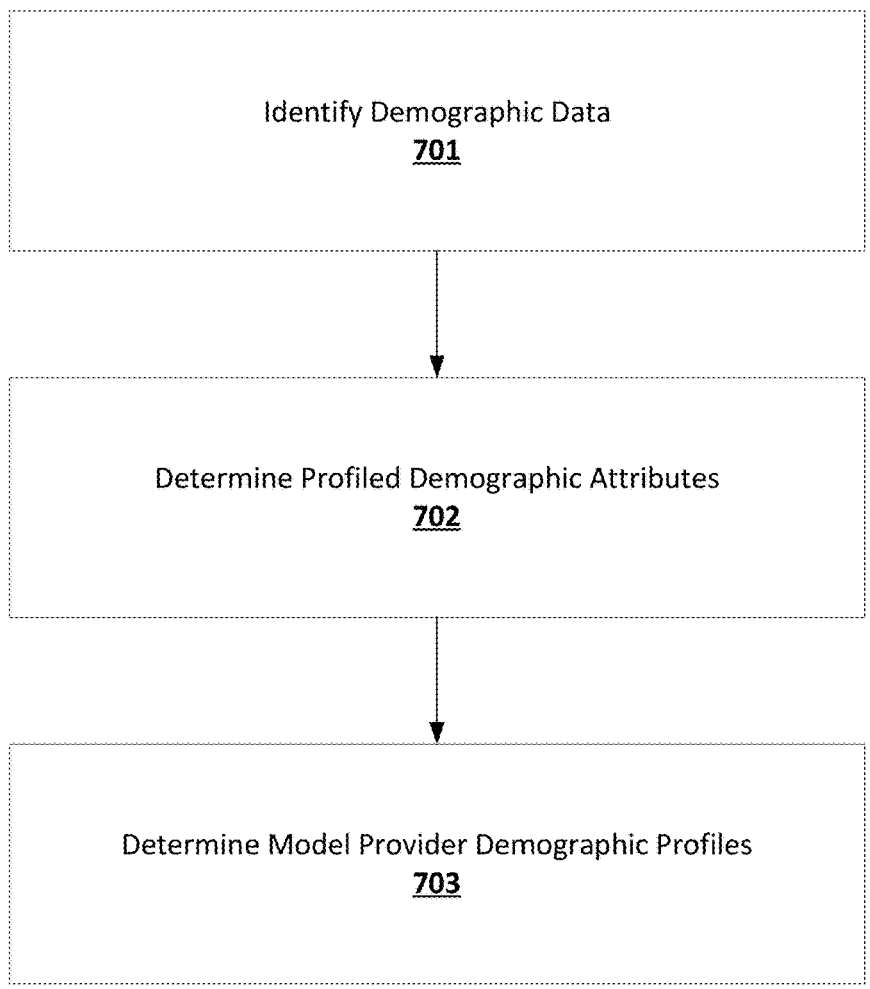

FIG. 7 is a flowchart diagram of an example process for determining model provider demographic profiles in accordance with some embodiments discussed herein.

Figure 8:
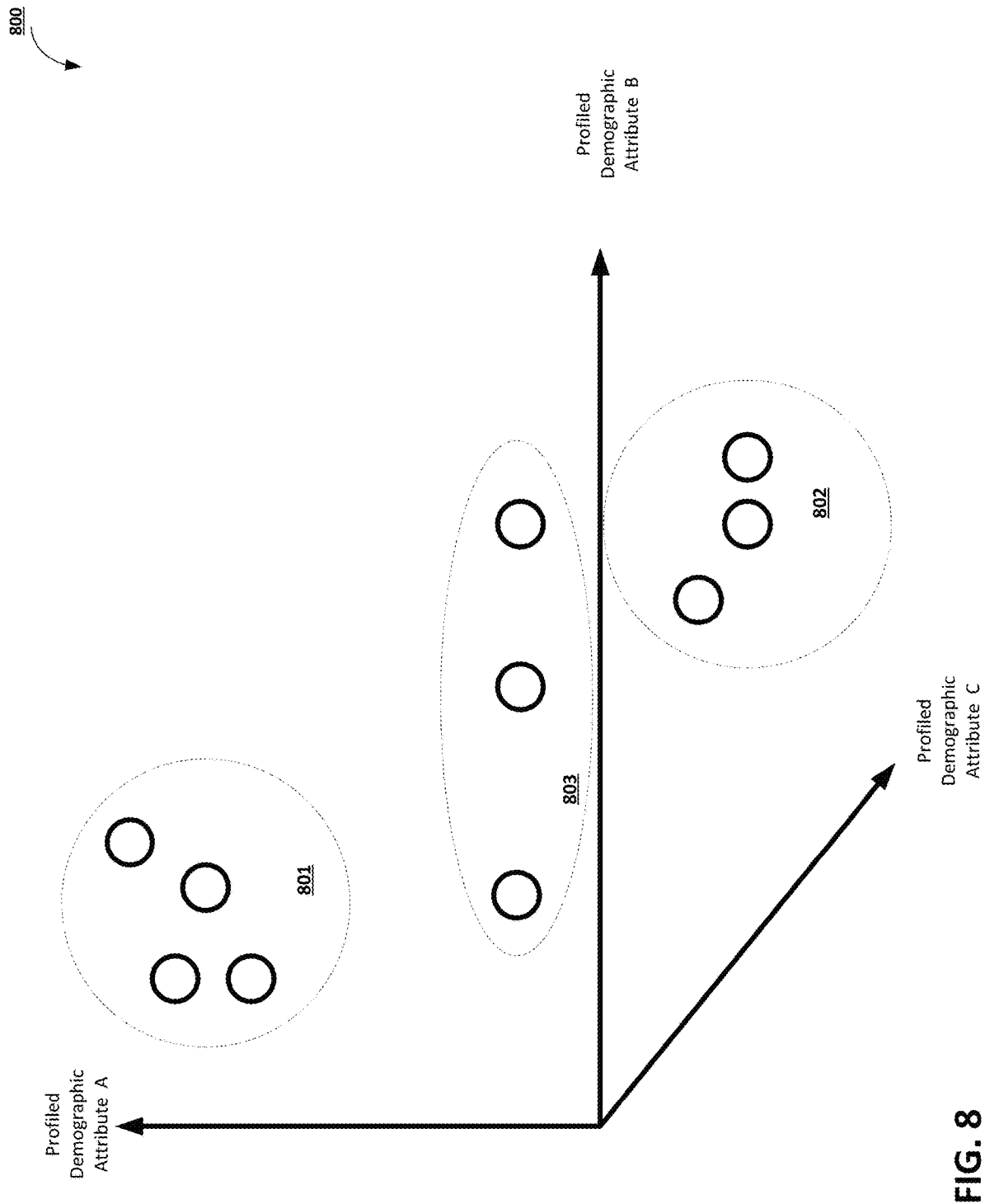

FIG. 8 provides an operational example of a profile generation multidimensional space in accordance with some embodiments discussed herein.

Figure 9:
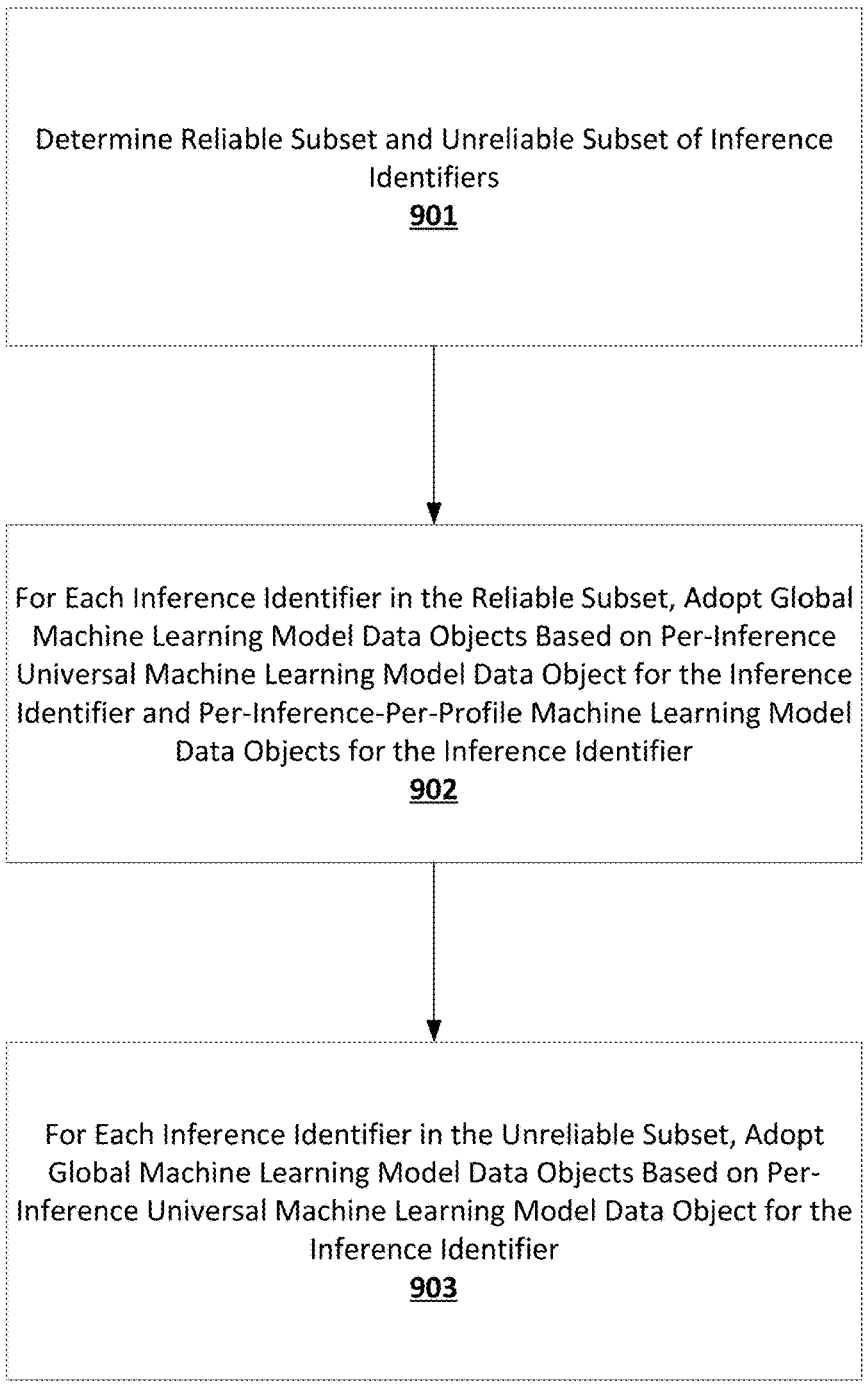

FIG. 9 is a flowchart diagram of an example process for generating global machine learning models in accordance with some embodiments discussed herein.

Figure 10:
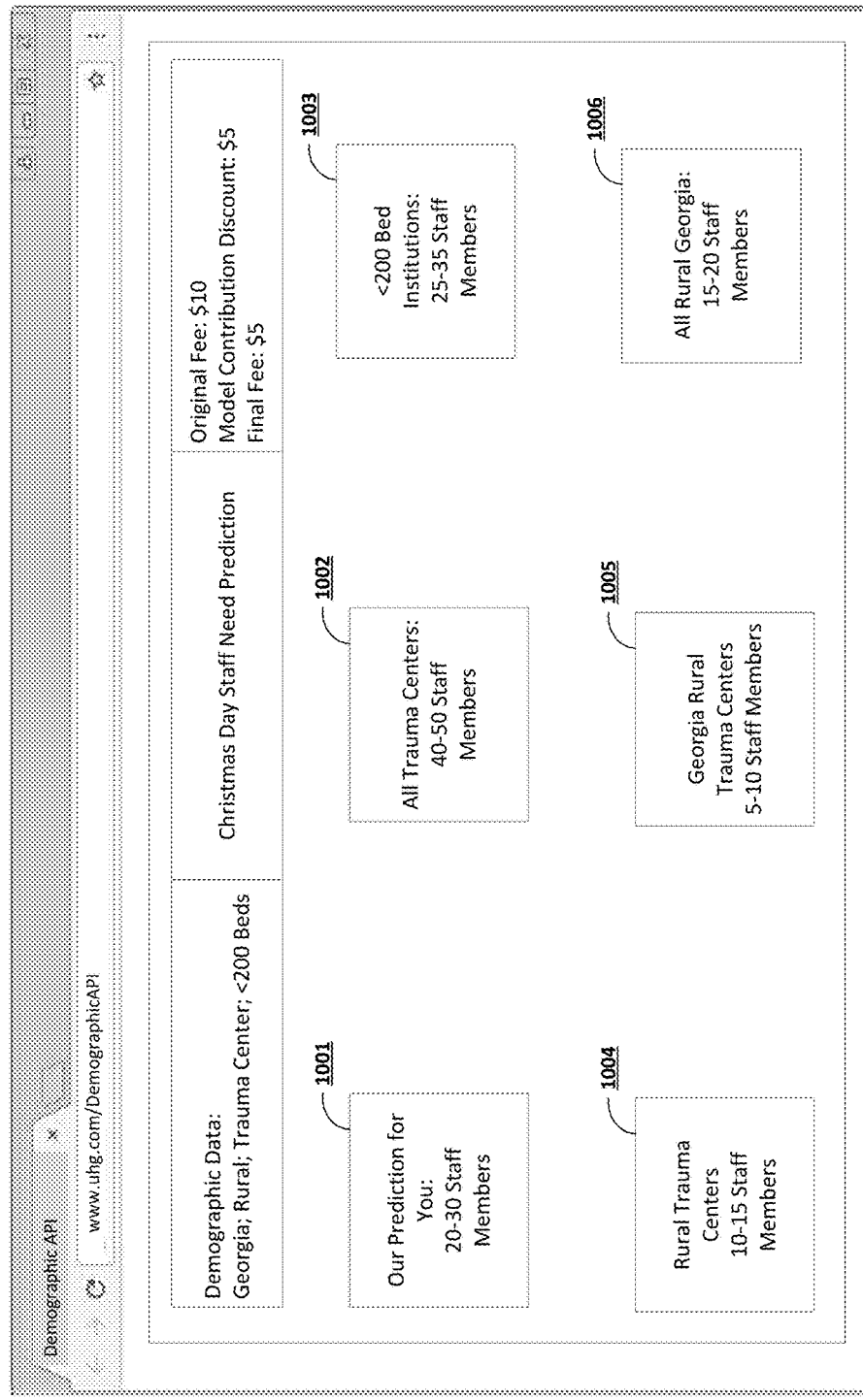

FIG. 10 provides an operational example of a predictive output user interface in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Federated machine learning refers to a set of techniques according to which machine learning models are trained across multiple sets of decentralized periphery nodes, where the periphery nodes then pass model definition data (e.g., trained parameters and/or hyper-parameters) to a centralized server configured to merge the model definition data of decentralized periphery nodes to generate aggregated models. Because federated machine learning techniques typically eliminate the need for decentralized periphery nodes to pass model input data (e.g., observed training input data) to centralized servers, such federated machine learning techniques are often utilized to enhance the network security and network transmission efficiency of distributed machine learning architectures. In other words, the hope is that eliminating model input data transmissions can mitigate the risks associated with exposure of such data over networked connections between periphery nodes and centralized servers as well as reduce the network efficiency costs associated with transmitting often massive amounts of model input data to centralized servers.

However, predictive reliability of many existing federated machine learning techniques is hampered by their inability to take into account demographic characteristics of decentralized periphery nodes that may be hard to extract from model definition data alone. For example, model definition data of a rural hospital may be of little value to an urban hospital and vice versa, yet these demographic considerations are hard to encode and transmit through model definition data. This and other related shortcomings of various existing federated machine learning concepts have undermined the reliability of those techniques for deployment in complex predictive domains with a variety of domain-specific variables that affect predictive outcomes, such as in various complex healthcare-related domains.

Various embodiments of the present invention address the noted problems associated with network security and network transmission efficiency of distributed predictive data analysis architectures by enabling techniques that allow peripheral local model provider nodes in such distributed predictive data analysis architectures to have access to predictive models that are fine-tuned to accommodate their demographic and operational features while avoiding the need to provide model input data associated with such peripheral local model provider nodes to a centralized predictive data analysis server tasked to generate demographic-aware predictive data analysis models and/or demographic-aware predictions. For example, various embodiments of the present invention enable mapping demographic variances among model provider agents using model provider demographic profiles and utilizing the noted demographic profiles to generate global predictive models that are both inference-specific and demographic-profile-specific.

By utilizing the above-noted techniques, various embodiments of the present invention can enable utilizing federated machine learning techniques that are more reliable for deployment in complex predictive domains. Accordingly, by enhancing accuracy and reliability of various federated machine learning techniques that in turn enhance network security and network transmission efficiency of distributed predictive data analysis architectures, various embodiments of the present invention address the above-noted problems associated with network security and network transmission efficiency of distributed predictive data analysis architectures, make substantial improvements to improving network security and network transmission efficiency of distributed predictive data analysis architectures, and make important contributions to the fields of machine learning, artificial intelligence, and predictive data analysis. Moreover, by enabling generating global machine learning models without requiring transmission of underlying predictive input data to centralized servers, various embodiments of the present invention enable machine learning systems to overcome regulatory restrictions related to data collections and/or to preserving end-user privacy.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 is a schematic diagram of an example architecture 100 for performing demographic-aware federated machine learning. The architecture 100 includes a predictive data analysis system 101 configured to receive predictive data analysis requests from external computing entities 102, process the predictive data analysis requests to generate predictions, provide the generated predictions to the external computing entities 102, and automatically perform prediction-based actions based at least in part on the generated predictions. The predictive data analysis system 101 may further be configured to receive local machine learning data objects from the external computing entities 102, process the local machine learning data objects to generate global machine learning data objects, and provide a demographic-aware API using the generated global machine learning models. Examples of external computing entities 102 include computing entities associated with model provider agents as well as query-initiating computing entities.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more external computing entities 102, process the predictive data analysis requests to generate the generated predictions corresponding to the predictive data analysis requests, provide the generated predictions to the external computing entities 102, and automatically perform prediction-based actions based at least in part on the generated predictions. The predictive data analysis computing entity 106 may further be configured to receive local machine learning data objects from the external computing entities 102, process the local machine learning data objects to generate global machine learning data objects, and provide a demographic-aware API using the generated global machine learning models.

The storage subsystem 108 may be configured to store input data used by the predictive data analysis computing entity 106 to perform predictive data analysis, demographic data used by the predictive data analysis computing entity 106 to generate global machine learning model data objects, as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. EXEMPLARY SYSTEM OPERATIONS

FIG. 4 is a flowchart diagram of an example process 400 for performing demographic-aware federated machine learning. Via the various steps/operations of process 400, a predictive data analysis computing entity 106 may enable utilizing federated machine learning techniques that are more reliable for deployment in complex predictive domains as well as constructing distributed predictive data analysis architectures that enable additional network security capabilities and additional network transmission efficiency compared to various existing distributed predictive data analysis architectures.

The process 400 begins at step/operation 401 when the predictive data analysis computing entity 106 identifies one or more model provider agents. A model provider agent may be a computer system configured to provide a local machine learning model data object to the predictive data analysis computing entity 106. Examples of model provider agents include computer systems associated with medical service provider institutions, such as hospitals, first aid centers, trauma centers, doctors' offices, and/or the like. In some embodiments, the model provider agents may be configured to periodically provide local machine learning model data objects to the predictive data analysis computing entity 106.

A local machine learning model data object provided by a model provider agent is a data object that describes parameters and/or hyper-parameters of a machine learning model trained by one or more computing entities deemed local to the model provider agent. For example, consider the neural network machine learning model 500 of FIG. 5, which is a machine learning model configured to process an input (e.g., the example input 501) in accordance with its layers and parameters in order to generate a predictive output 502 by its output layer. In some embodiments, a local machine learning model data object for the depicted neural network machine learning model 500 may describe at least one of the following: (i) a two-dimensional array that includes, in its [i, j] location, a trained parameter value configured to be applied to the output of the ith node of the depicted neural network machine learning model 500 as part of the forward propagation processing of the jth node of the depicted neural network machine learning model 500; (ii) a one-dimensional array that describes, for each node of the depicted neural network machine learning model 500, the activation function used by the node; and (iii) other hyper-parameter data that include information about pre-processing of input data of the depicted neural network machine learning model 500, information about application of any functions (e.g., a softmax function) to the output of the depicted neural network machine learning model 500 before calculating an error measure for the depicted neural network machine learning model 500 during training of the depicted neural network machine learning model 500, information about any bias values associated with any node of the depicted neural network machine learning model, and/or the like.

In some embodiments, in addition to a local machine learning model data object, a model provider agent may provide demographic data about a real-world entity associated with the model provider agent to the predictive data analysis computing entity 106. Additionally or alternatively, the predictive data analysis computing entity 106 may maintain demographic data associated with at least some of the model provider agents in the storage subsystem 108. In general, demographic data for a model provider agent may include any information that describes a real-world property of a real-world entity associated with the model provider agent. Examples of demographic data items include geographic identifiers, service type descriptors, service level descriptors, operational capacity descriptors, observed operational metrics, and/or the like. In some embodiments, a model provider agent transmits a corresponding local machine learning model data object and corresponding demographic data to the predictive data analysis computing entity 106 as part of a local input data object.

For example, as depicted in FIG. 6, the exemplary local input data object 600 includes local machine learning model data 601 as well as demographic data 602. As further depicted in FIG. 6, the local machine learning model data 601 includes parameters of a corresponding local machine learning model, while the demographic data 602 includes a number of available beds of a corresponding medical facility institution, an annual revenue of the corresponding medical facility institution, a location descriptor of corresponding medical facility institution, a trauma center designation of the corresponding medical facility institution, and a per-disease patient count descriptor for corresponding medical facility institution in relation to the Emergency Department (ED) of the corresponding medical facility institution.

While various embodiments of the present invention have been described with respect to local machine learning models that are neural network machine learning models, a person of ordinary of skill in the relevant technology will recognize that other local machine learning models may be utilized. Examples of suitable machine learning models decision trees (including gradient boosting and random forest), support vector machines, linear regression models, logistic regression models, Bayesian networks, and neural networks (including feed-forward neural networks, fully-connected neural networks, convolutional neural networks, recurrent neural networks, and/or the like).

At step/operation 402, the predictive data analysis computing entity 106 receives a plurality of local machine learning model data objects associated with one or more inference identifiers from the model data object provider agents. In some embodiments, each local machine learning model data object is received from a corresponding model data object provider agent. In some embodiments, each local machine learning model data object is associated with an inference identifier of the one or more inference identifiers and at least one provider demographic profile of one or more model provider demographic profiles.

An inference identifier for a local machine learning model data object is a data object that describes a predictive inference configured to be performed by a local machine learning model described by the local machine learning model data object. An example of an inference identifier is an inference identifier that describes a predicted health-related outcome of a particular patient having particular patient features and/or a predicted operational state of a particular medical facility having particular operational facility features. In some embodiments, an inference identifier describes at least one of a desired output of a corresponding predictive inference and a desired input of a corresponding predictive inference. For example, an inference identifier may describe a predictive inference configured to predict an available number of beds in a particular hospital. As another example, an inference identifier may describe a predictive inference configured to predict an available number of beds in a particular hospital given inputs that describe particular weather conditions of a relevant geographic area of the particular hospital.

A model provider demographic profile is a data object that describes a profiled attribute value range for each profiled demographic attribute of one or more profiled demographic attributes. A profiled demographic attribute is a data object that describes a category of demographic data that can be extracted from the demographic data for at least one model provider agent of the model provider agents identified in step/operation 401. Examples of profiled demographic attributes include a number of beds data category, an annual revenue data category, a rural location descriptor data category, and/or the like.

A model provider demographic profile may describe a unique combination of associated ranges or specific values for each profiled demographic attribute of the noted profiled demographic attributes. For example, a first model provider demographic attribute may describe model provider agents that are rural, that have an annual revenue of less than $100,000, that have a number of beds of less than one hundred beds, and that are either trauma centers or not. As another example, a second model provider demographic attribute may describe model provider agents that are urban or suburban, that have an annual revenue of between $200,000 and $1,000,000, that have a number of beds between one hundred beds and a thousand beds, and that are trauma centers. As yet another example, a third model provider demographic attribute may describe model provider agents that are urban or suburban, that have an annual revenue of between $200,000 and $1,000,000, that have a number of beds between one hundred beds and a thousand beds, and that are not trauma centers.

In some embodiments, determining model provider demographic profiles can be performed in accordance with the process 700 depicted in FIG. 7. As depicted in FIG. 7, the process 700 begins at step/operation 701 when the predictive data analysis computing entity 106 identifies demographic profile data for the model provider agents identified in step/operation 401, where the demographic data comprises demographic schema data and demographic attribute value data. The demographic schema data may identify at least some of the attributes described by the demographic data, while the demographic attribute value data may identify values of attributes identified by the schema data according to the demographic data. For example, as depicted in the demographic data 602 of the local input data object 600 of FIG. 6, the demographic data 602 include demographic schema data 611 and the demographic attribute value data 612.

At step/operation 702, the predictive data analysis computing entity 106 determines one or more profiled demographic attributes based at least in part on the demographic schema data. In some embodiments, the predictive data analysis computing entity 106 adopts each attribute identified by the demographic schema data as a profiled demographic attribute. In some embodiments, the predictive data analysis computing entity 106 identifies a subset of the attributes identified by the schema data as profiled demographic attributes. For example, the predictive data analysis computing entity 106 may identify a subset of the attributes identified by the schema data having a relatively greater measure of variety and/or a relatively greater measure of polarization across the model provider agents identified in step/operation 401 as the profiled demographic attributes.

In some embodiments, the predictive data analysis computing entity 106 performs one or more feature engineering operations on the attributes identified by the schema data and/or on the attributes identified by the schema data that have a greater measure of variety and/or a greater measure of polarization across the model provider agents to generate the profiled demographic attributes. For example, the predictive data analysis computing entity 106 may perform a dimensionality reduction operation (e.g., such as a principal-component-analysis-based dimensionality reduction operation) on the attributes identified by the schema data and/or on the attributes identified by the schema data that have a greater measure of variety and/or a greater measure of polarization across the model provider agents At step/operation 703, the predictive data analysis computing entity 106 determines the model provider demographic profiles based at least in part on the demographic attribute value data and the profiled demographic attributes that the predictive data analysis computing entity 106 identified in step/operation 702. In some embodiments, to generate the model provider demographic profiles based at least in part on the demographic attribute value data, the predictive data analysis computing entity 106 identifies a total range for each of the profiled demographic attributes based at least in part on the attribute values for the profiled demographic attribute as identified by the demographic attribute value data. Thereafter, the predictive data analysis computing entity 106 divides a total range of each of the m profiled demographic attributes into n subranges (e.g., n subranges of equal size across each total range for a profiled demographic attribute) and generates m*n unique combinations of the generated subranges, where each unique combination is associated with a corresponding subrange of the n subranges for each profiled demographic attribute of the m profiled demographic attributes. In some of the noted embodiments, the predictive data analysis computing entity 106 adopts at least some of the m*n unique combinations of the subranges (e.g., all of the m*n unique combinations of the subranges) as the model provider demographic profiles.

In some embodiments, to generate the model provider demographic profiles based at least in part on the demographic attribute value data and the profiled demographic attributes, the predictive data analysis computing entity 106 first maps each model provider agent to a point in a multi-dimensional space in accordance with each demographic attribute value for the model provider agent in relation to a corresponding profiled demographic attribute. Thereafter, the predictive data analysis computing entity 106 utilizes a clustering technique (e.g., a K-nearest-neighbor-based clustering technique) to identify particular subspaces of the multi-dimensional space each that is associated with a range for each profiled demographic attribute as model provider demographic profiles.

For example, as depicted in FIG. 8, the profile generation multi-dimensional space 800 of FIG. 8 includes a mapping for thirteen model provider agents in accordance with the demographic attribute values for the thirteen model provider agents in relation to three profiled demographic attributes (denoted as the profiled demographic attribute A, the profiled demographic attribute B, and the profiled demographic attribute C). As further depicted in FIG. 8, the predictive data analysis computing entity 106 has utilized the thirteen mappings of the thirteen model provider agents to generate three model provider demographic profiles, i.e., the first model provider demographic profile 801, the second model provider demographic profile 802, and the third model provider demographic profile 803.

In some embodiments, the model provider demographic profiles determined by the predictive data analysis computing entity 106 includes a universal model provider demographic profile as well as one or more non-universal model provider demographic profile. A universal model provider demographic profile is a model provider demographic profile whose corresponding profiled attribute value ranges have been defined broadly to capture all of the model provider agents identified in step/operation 401 and/or all of the model provider agents associated with the particular demographic-aware federated machine learning performed by the predictive data analysis computing entity 106 (e.g., all of the medical institutions utilizing the predictive data analysis computing entity 106). For example, a universal model provider demographic profile may have a maximal and/or an all-inclusive profiled attribute value range for each profiled demographic attribute.

A non-universal model provider demographic profile is a model provider demographic profile whose corresponding profiled attribute value ranges have been defined relatively narrower to capture a feature-defined subset of the model provider agents identified in step/operation 401 and/or a feature-defined subset of the model provider agents associated with the particular demographic-aware federated machine learning performed by the predictive data analysis computing entity 106. For example, a non-universal model provider demographic profile may relate to rural trauma centers with less than 100 beds in the Southern Michigan district.

Returning to FIG. 4, at step/operation 403, the predictive data analysis computing entity 106 generates a per-inference universal machine learning model data object for each inference identifier based at least in part on a per-inference local model subset of the local machine learning model data objects received in step/operation 402, where the per-inference local model subset for each inference identifier includes each local machine learning data object that is associated with the particular inference identifier. A per-inference universal machine learning model data object may be a data object that describes parameters and/or hyper-parameters of a corresponding per-inference universal machine learning model generated by aggregating the per-inference local model subset for the inference identifier that is associated with the per-inference universal machine learning model data object. In some embodiments, a per-inference universal machine learning model data object for a particular inference identifier is a data object that describes a machine learning model associated with the inference identifier and a universal model provider demographic profile.

In some embodiments, to aggregate the per-inference local model subset for an inference identifier in order to generate a corresponding per-inference universal machine learning model for the inference identifier, the predictive data analysis computing entity 106 utilizes a Bayesian non-parametric model aggregation model, such as a Bayesian non-parametric model aggregation model that comprises a Beta-Bernoulli process. Examples of suitable model aggregation techniques that can be utilized to generate per-inference universal machine learning models include the techniques described in Yurochkin et al, *Bayesian Nonparametric Federated Learning of Neural Networks*, arXiv: 1905.12022 [stat.ML], available online at: https://arxiv.org/abs/1905.12022, which is hereby incorporated by reference in its entirety.

While various embodiments of the present invention have been descripted with respect to per-inference universal machine learning models that are neural network machine learning models, a person of ordinary of skill in the relevant technology will recognize that other per-inference universal machine learning models may be utilized. Examples of suitable machine learning models decision trees (including gradient boosting and random forest), support vector machines, linear regression models, logistic regression models, Bayesian networks, and neural networks (including feed-forward neural networks, fully-connected neural networks, convolutional neural networks, recurrent neural networks, and/or the like).

At step/operation 404, the predictive data analysis computing entity 106 determines a per-inference statistical relevance measure for each per-inference universal machine learning model data object identified in step/operation 403. A per-inference statistical relevance measure for a corresponding per-inference universal machine learning model data object may describe an estimated predictive reliability of the corresponding per-inference universal machine learning model data object, e.g., based at least in part on the estimated amount of data used to train a corresponding per-inference universal machine learning model associated with the corresponding per-inference universal machine learning model data object, an estimated quality of a training algorithm used to train the corresponding per-inference universal machine learning model, an estimated predictive capability of the corresponding per-inference universal machine learning model, an estimated cross-temporal accuracy of the predictions provided by the corresponding per-inference universal machine learning model data object, an estimated over-fitness measure for the corresponding per-inference universal machine learning model data object, and/or the like.

In some embodiments, the per-inference statistical relevance measure for a per-inference universal machine learning model data object that is associated with an inference identifier is determined based at least in part on an estimated field size of training data used to generate the per-inference universal machine learning model data object for the inference identifier. In some embodiments, the per-inference statistical relevance measure for a per-inference universal machine learning model data object that is associated with an inference identifier is determined based at least in part on an estimated attribute size of training data used to generate the per-inference universal machine learning model data object for the inference identifier. In some embodiments, the estimated field size of training data used to train a per-inference universal machine learning model data object is determined based on an estimated operational capacity and/or an estimated visitation rate of each particular model provider agent whose local machine learning model data object has been used to generate the noted per-inference universal machine learning model data object.

At step/operation 405, the predictive data analysis computing entity 106 generates (e.g., based at least in part on each statistical relevance measure determined in step/operation 404) one or more per-inference-per-profile global machine learning model data objects for each inference identifier, where each inference-per-profile global machine learning model data object for an inference identifier is associated with the inference identifier and a corresponding non-universal model provider demographic profile of one or more non-universal model provider demographic profiles of the model provider demographic profiles. In some embodiments, to generate per-inference-per-profile global machine learning model data objects for the inference identifier, the predictive data analysis computing entity 106 uses the statistical relevance measure for the per-inference universal data object associated with the noted inference identifier.

In some embodiments, a per-inference-per-profile global machine learning model data object is a data object for an inference identifier that describes parameters and/or hyper-parameters of a corresponding per-inference-per-profile global machine learning model for an inference identifier, where a per-inference-per-profile global machine learning model for an inference identifier is generated by aggregating a per-inference-per-profile local model subset of the local machine learning models received in step/operation 402 that are associated with the inference identifier and a corresponding non-universal model provider demographic profile. An example of a per-inference-per-profile global machine learning model data object is a data object that describes parameters and/or hyper-parameters of a trained model to predict a visitation rate of a rural trauma center in the Southern Michigan district.

In some embodiments, to aggregate the per-inference-per-profile local model subset for an inference identifier and a non-universal demographic profile in order to generate a corresponding per-inference-per-profile machine learning model for the inference identifier and the non-universal demographic profile, the predictive data analysis computing entity 106 utilizes a Bayesian non-parametric model aggregation model, such as a Bayesian non-parametric model aggregation model that comprises a Beta-Bernoulli process. Examples of suitable model aggregation techniques that can be utilized to generate per-inference-per-profile machine learning models include the techniques described in Yurochkin et al, *Bayesian Nonparametric Federated Learning of Neural Networks*, arXiv: 1905.12022 [stat.ML], available online at: https://arxiv.org/abs/1905.12022, which is incorporated herein by reference in its entirety.

In some embodiments, to generate a per-inference-per-profile machine learning model for an inference identifier and a demographic profile, the predictive data analysis computing entity 106 extracts the per-inference-per-profile machine learning model from a per-inference universal machine learning model for the particular inference identifier and/or from a per-inference universal machine learning data object for the particular inference identifier.

While various embodiments of the present invention have been described with respect to per-inference-per-profile machine learning models that are neural network machine learning models, a person of ordinary of skill in the relevant technology will recognize that other per-inference-per-profile machine learning models may be utilized. Examples of suitable machine learning models decision trees (including gradient boosting and random forest), support vector machines, linear regression models, logistic regression models, Bayesian networks, and neural networks (including feed-forward neural networks, fully-connected neural networks, convolutional neural networks, recurrent neural networks, and/or the like).

In some embodiments, the per-inference universal machine learning data objects and per-inference-per-profile machine learning data objects are examples of global machine learning data objects. A global machine learning data object is a data object that describes a global machine learning model that is associated with an inference-profile pair associated with an inference identifier and a model provider demographic profile (regardless of whether the model provider demographic profile is a universal model provider demographic profile or a non-universal model provider demographic profile).

In some embodiments, the predictive data analysis computing entity 106 is configured to, for each inference-profile pair that is associated with a corresponding inference identifier of one or more inference identifiers and a corresponding model data object provider profile of the one or more model provider demographic profiles, generate a global machine learning model data object based at least in part on a related local model subset of the local machine learning model data objects for the inference-profile pair, where the related local model subset for an inference-profile pair may comprise local machine learning model data objects that are associated with the corresponding inference identifier for the inference-profile pair and the corresponding model provider profile for the inference-profile pair.

In some embodiments, generating each global machine learning model data object based at least in part on the related local model subset that is associated with an inference-profile pair for the global machine learning model data object comprises processing the related local model subset in accordance with a Bayesian non-parametric model aggregation model to generate the global machine learning model data object. In some embodiments, the Bayesian non-parametric model aggregation model that comprises a Beta-Bernoulli processing routine. Examples of suitable model aggregation techniques that can be utilized to generate global machine learning models include the techniques described in Yurochkin et al, *Bayesian Nonparametric Federated Learning of Neural Networks*, arXiv: 1905.12022 [stat.ML], available online at: https://arxiv.org/abs/1905.12022, which is incorporated herein by reference in its entirety.

In some embodiments, generating a plurality of global machine learning model data objects comprises, for each inference identifier of the one or more inference identifiers: (i) generating a per-inference universal machine learning model data object for the inference identifier and a universal model provider demographic profile of the one or more model provider demographic profiles; (ii) determining a per-inference statistical relevance measure (e.g., a model-generated confidence value) for the per-inference universal machine learning model data object; (iii) determining whether the per-inference statistical relevance measure satisfies a statistical relevance measure threshold; (iv) in response to determining that the per-inference statistical relevance measure satisfies the statistical relevance measure threshold: (a) generating one or more per-inference-per-profile global machine learning model data objects each associated with the inference identifier and a corresponding non-universal model provider demographic profile of one or more non-universal model provider demographic profiles of the model provider demographic profiles, and (b) adopting the per-inference universal machine learning model data object for the inference identifier and the one or more per-inference-per-profile global machine learning model data objects as global machine learning model data objects for the inference identifier; and (v) and in response to determining that the per-inference statistical relevance measure fails to satisfy the statistical relevance measure threshold, adopting the per-inference universal machine learning model data object as a sole global machine learning model data object for the inference identifier among the plurality of global machine learning model data objects.

In some embodiments, generating global machine learning models may be performed in accordance with the process 900 depicted in FIG. 9. As depicted in FIG. 9, the process 900 begins at step/operation 901 when the predictive data analysis computing entity 106 divides the inference identifiers into a reliable subset and an unreliable subset. In some embodiments, the reliable subset of the inference identifiers includes inference identifiers whose per-inference universal machine learning models have a statistical relevance threshold (e.g., corresponding model-generated confidence value) satisfies (e.g., exceeds) a statistical relevance threshold, while the unreliable subset of the inference identifiers includes inference identifiers whose per-inference universal machine learning models have a statistical relevance threshold (e.g., a corresponding model-generated confidence value) that fails to satisfy (e.g., fails to exceed) a statistical relevance threshold.

At step/operation 902, for each inference identifier in the reliable subset, the predictive data analysis computing entity 106 adopts one or more per-inference-per-profile global machine learning model data objects for the inference identifier and the per-inference universal machine learning data object for the inference identifier as global machine learning model data objects for the inference identifier. In some of the noted embodiments, if the per-inference universal machine learning model for the inference identifier and a universal model provider demographic profile satisfies a statistical relevance threshold, the predictive data analysis computing entity 106 adopts non-universal machine learning models associated with the inference identifier as part of the global machine learning models for the inference identifier.

At step/operation 903, for each inference identifier in the unreliable subset, the predictive data analysis computing entity 106 adopts the per-inference universal machine learning data object for the inference identifier as the sole global machine learning model data object for the inference identifier. In some of the noted embodiments, if the per-inference universal machine learning model for the inference identifier and a universal model provider demographic profile fails to satisfy a statistical relevance threshold, the predictive data analysis computing entity 106 does not adopt non-universal machine learning models associated with the inference identifier as global machine learning models for the inference identifier.

In some embodiments, generating a plurality of global machine learning model data objects by the predictive data analysis computing entity 106 comprises, for each inference identifier of the one or more inference identifiers: (i) determining a per-model statistical relevance measure (e.g., a model-generated confidence value) for a particular machine learning model; (ii) in response to determining that the per-model measure satisfies the statistical relevance measure threshold, including the particular machine learning model as part of the global machine learning models; and (iii) in response to determining that the per-model measure fails to satisfy the statistical relevance measure threshold, refusing to include the particular machine learning model as part of the global machine learning models.

While various embodiments of the present invention have been descripted with respect to global machine learning models that are neural network machine learning models, a person of ordinary of skill in the relevant technology will recognize that other global machine learning models may be utilized. Examples of suitable machine learning models decision trees (including gradient boosting and random forest), support vector machines, linear regression models, logistic regression models, Bayesian networks, and neural networks (including feed-forward neural networks, fully-connected neural networks, convolutional neural networks, recurrent neural networks, and/or the like).

Returning to FIG. 4, at step/operation 406, the predictive data analysis computing entity 106 provides a demographic-aware predictive data analysis API based at least in part on at least one of the per-inference universal machine learning models and per-inference-per-profile machine learning models. In some embodiments, the demographic-aware predictive data analysis API is accessible by the plurality of model data object provider agents. The demographic-aware predictive data analysis API may be configured to receive predictive inference queries from query-initiating devices having particular demographic profile associations as API calls and return in response API results for the received predictive inference queries that include universal results as well as demographically-refined results for the received predictive inference queries.

For example, in response to a request for a health-related prediction by a query-initiating device associated with a rural trauma center in Georgia, the demographic-aware predictive data analysis API may be configured to return results for the health-related prediction across all monitored institutions, across all trauma centers, across all rural trauma centers, across all monitored institutions in Georgia, across all trauma centers in Georgia, across all rural monitored institutions in Georgia, across all rural trauma centers in Georgia, and/or the like.

The demographic-aware predictive data analysis API may be configured to identify demographic associations of query-initiating devices based at least in part on demographic data provided as part of the predictive inference queries, based at least in part on demographic data associated with query-initiating devices that is maintained in the storage subsystem 108, based at least in part on Internet Protocol (IP) address association data of query-initiating devices and demographic data associated with IP addresses that is maintained in the storage subsystem 108 and/or the like.

In some embodiments, the demographic-aware predictive data analysis API is configured to receive a predictive inference query from a first model data object provider agent of the plurality of model data object provider agents; determining a query-related subset of plurality of global machine learning model data objects that are associated with the predictive inference query; process the predictive inference query in accordance with the query-related subset to generate one or more per-model data object predictive inference outputs; and provide the one or more per-model data object predictive inference outputs to the first model data object provider agent. In some of the noted embodiments, identifying the query-related subset for the predictive inference query comprises determining an inferred inference identifier of the one or more inferred inference identifiers that is associated with the predictive inference query; determining one or more related model provider demographic profiles of the one or more model provider demographic profiles that are associated with the first model data object provider agent; and determining the query-related subset based at least in part on each global machine learning model data object of the plurality of global machine learning model data objects that is associated with the inferred inference identifier and a related model provider demographic profile of the one or more related model provider demographic profiles.

In some embodiments, the demographic-aware predictive data analysis API is configured to provide user interface data (Hyper-Text Markup Language (HTML) data) for predictive output user interfaces to query-initiating devices. An operational example of a predictive output user interface 1000 is presented in FIG. 10. As depicted in FIG. 10, the predictive output user interface 1000 includes an aggregated Christmas day staff need prediction for an institution associated with the query-initiating user device via user interface element 1001, Christmas day staff need prediction for all trauma centers via user interface element 1002, Christmas day staff need prediction for medical service providers with less than 200 beds via user interface element 1003, and Christmas day staff need prediction for all rural trauma centers via user interface element 1004, Christmas day staff need prediction for all rural trauma centers in Georgia via user interface element 1005, and Christmas day staff need prediction for all rural Georgia medical institutions via user interface element 1006.

In some embodiments, the demographic-aware predictive data analysis API is configured to perform prediction-based actions based at least in part on prediction outputs provided in response to received predictive inference queries. Examples of prediction-based actions include automatic appointment scheduling, automatic generation of provider notifications, automatic generation of patient notifications, and/or the like.

In some embodiments, the predictive data analysis computing entity 106 may be configured to provide the demographic-aware predictive data analysis API to particular registered query-initiating user profiles (e.g., query-initiating user profiles associated with real persons and/or with legal persons such as institutional entities) for a fee. In some of the noted embodiments, query-initiating user profiles associated with model provider agents may utilize services of the demographic-aware predictive data analysis API for a discounted fee.

In some embodiments, the magnitude of discount applied to a particular query-initiating user profile that is a model provider agent may depend in part on the amount of contribution of the query-initiating user profile to generating the machine learning models used by the demographic-aware predictive data analysis API. In some embodiments, the magnitude of discount applied to a particular query-initiating user profile that is a model provider agent may depend in part on the duration of contribution of the query-initiating user profile to generating the machine learning models used by the demographic-aware predictive data analysis API. In some embodiments, the magnitude of discount applied to a particular query-initiating user profile that is a model provider agent may depend in part on an estimated predictive quality of the contribution of the query-initiating user profile to generating the machine learning models used by the demographic-aware predictive data analysis API.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
   receiving, by one or more processors, a plurality of local machine learning model data objects, wherein each local machine learning model data object of the plurality of local machine learning model data objects is (i) received from a respective model data object provider agent of a plurality of model data object provider agents, (ii) associated with a respective inference identifier of a plurality of inference identifiers, (iii) associated with a respective model provider demographic profile of a plurality of model provider demographic profiles comprising demographic data of the respective model data object provider agent is received, wherein the plurality of model data object provider agents is mapped in a multi-dimensional space based at least in part on the plurality of model provider demographic profiles;
   for each selected local machine learning model data object comprising a selected inference identifier and a selected model provider demographic profile, generating, by the one or more processors, a respective global machine learning model data object based at least in part on a plurality of related local machine learning model data objects of the plurality of local machine learning model data objects, wherein (i) each related local machine learning model data object of the plurality of related local machine learning model data objects is associated with the selected inference identifier and the selected model provider demographic profile, (ii) the selected local machine learning model data object is selected based at least in part on a mapping of the multi-dimensional space, and (iii) the selected inference identifier is associated with a per-inference universal machine learning model data object associated with a per-inference statistical relevance measure; and
   providing, by the one or more processors and based at least in part on each of the respective global machine learning model data object, a demographic-aware predictive data analysis application programming interface (API) that is accessible by the plurality of model data object provider agents.

2. The computer-implemented method of claim 1, further comprising generating, by the one or more processors, the selected model provider demographic profile for each selected local machine learning model data object by:
   identifying the demographic data for the respective model data object provider agent, wherein the demographic data comprises demographic schema data and demographic attribute value data;
   determining, based at least in part on the demographic schema data, one or more profiled demographic attributes for the respective model data object provider agent; and
   generating, based at least in part on the demographic attribute value data and the one or more profiled demographic attributes, the selected model provider demographic profile, wherein the selected model provider demographic profile is associated with a profiled demographic attribute value range.

3. The computer-implemented method of claim 1, wherein the selected model provider demographic profile comprises a universal model provider demographic profile.

4. The computer-implemented method of claim 1, wherein generating the respective global machine learning model data object for each selected local machine learning model data object comprises:
   generating the per-inference universal machine learning model data object and a universal model provider demographic profile,
   determining the per-inference statistical relevance measure for the per-inference universal machine learning model data object,
   determining whether the per-inference statistical relevance measure satisfies a statistical relevance measure threshold,
   in response to determining that the per-inference statistical relevance measure satisfies the statistical relevance measure threshold: (i) generating a per-inference-per-profile global machine learning model data object associated with (1) the selected inference identifier and (2) a non-universal model provider demographic profile, and (ii) adopting the per-inference-per-profile global machine learning model data object and the per-inference universal machine learning model data object as the respective global machine learning model data object for the selected inference identifier; and
   in response to determining that the per-inference statistical relevance measure does not satisfy the statistical relevance measure threshold, adopting the per-inference universal machine learning model data object as the respective global machine learning model data object for the selected inference identifier.

5. The computer-implemented method of claim 4, wherein the per-inference statistical relevance measure for each selected local machine learning model data object is determined based at least in part on an estimated field size of training data used to generate the per-inference universal machine learning model data object.

6. The computer-implemented method of claim 4, wherein the per-inference statistical relevance measure each selected local machine learning model data object is determined based at least in part on an estimated attribute size of training data used to generate the per-inference universal machine learning model data object.

7. The computer-implemented method of claim 1, wherein generating the respective global machine learning model data object for each selected local machine learning model data object comprises:
processing each related local machine learning data object using a Bayesian non-parametric aggregation model.

8. The computer-implemented method of claim 7, wherein the Bayesian non-parametric aggregation model comprises a Beta-Bernoulli processing routine.

9. The computer-implemented method of claim 1, wherein the demographic-aware predictive data analysis API is configured to:
receive a predictive inference query sent from a first model data object provider agent;
identify a query-related subset of plurality of global machine learning model data objects associated with the predictive inference query;
process the predictive inference query in accordance with the query-related subset to generate a per-model data object predictive inference output; and
provide the per-model data object predictive inference output to the first model data object provider agent.

10. The computer-implemented method of claim 9, wherein identifying the query-related subset for the predictive inference query comprises:
identifying an inferred inference identifier associated with the predictive inference query;
identifying a related model provider demographic profile associated with the first model data object provider agent; and
identifying the query-related subset based at least in part on each of the respective global machine learning model data object associated with (i) the inferred inference identifier and (ii) a related model provider demographic profile of the one or more related model provider demographic profiles.

11. The computer-implemented method of claim 1, wherein each of the respective model data object provider agent is associated with a medical service provider agent.

12. The computer-implemented method of claim 1, wherein each selected inference identifier is associated with a medical predictive inference subject.

13. An apparatus comprising a processor and memory including program code, the memory and the program code configured to, with the processor, cause the apparatus to at least:
receive a plurality of local machine learning model data objects, wherein each local machine learning model data object of the plurality of local machine learning model data objects is (i) received from a respective model data object provider agent of a plurality of model data object provider agents, (ii) associated with a respective inference identifier of a plurality of inference identifiers, (iii) associated with a respective model provider demographic profile of a plurality of model provider demographic profiles comprising demographic data of the respective model data object provider agent is received, wherein the plurality of model data object provider agents is mapped in a multi-dimensional space based at least in part on the plurality of model provider demographic profiles;
for each selected local machine learning model data object comprising a selected inference identifier and a selected model provider demographic profile, generate a respective global machine learning model data object based at least in part on a plurality of related local machine learning model data objects of the plurality of local machine learning model data objects, wherein (i) each related local machine learning model data object of the plurality of related local machine learning model data objects is associated with the selected inference identifier and the selected model provider demographic profile, (ii) the selected local machine learning model data object is selected based at least in part on a mapping of the multi-dimensional space, and (iii) the selected inference identifier is associated with a per-inference universal machine learning model data object associated with a per-inference statistical relevance measure; and
provide, based at least in part on each of the respective global machine learning model data object, a demographic-aware predictive data analysis application programming interface (API) that is accessible by the plurality of model data object provider agents.

14. The apparatus of claim 13, the memory and the program code further configured to, with the processor, cause the apparatus to at least generate the selected model provider demographic profile for each selected local machine learning model data object by:
identifying the demographic data for the respective model data object provider agent, wherein the demographic data comprises demographic schema data and demographic attribute value data;
determining, based at least in part on the demographic schema data, one or more profiled demographic attributes for the respective model data object provider agent; and
generating, based at least in part on the demographic attribute value data and the one or more profiled demographic attributes, the selected model provider demographic profile, wherein the selected model provider demographic profile is associated with a profiled demographic attribute value range.

15. The apparatus of claim 13, wherein generating the respective global machine learning model data object for each selected local machine learning model data object comprises:
generating the per-inference universal machine learning model data object and a universal model provider demographic profile,
determining the per-inference statistical relevance measure for the per-inference universal machine learning model data object,
determining whether the per-inference statistical relevance measure satisfies a statistical relevance measure threshold,
in response to determining that the per-inference statistical relevance measure satisfies the statistical relevance measure threshold: (i) generating a per-inference-per-profile global machine learning model data object associated with (1) the selected inference identifier and (2) a non-universal model provider demographic profile, and (ii) adopting the per-inference-per-profile global machine learning model data object and the per-inference universal machine learning model data object as the respective global machine learning model data object for the selected inference identifier; and in response to determining that the per-inference statistical relevance measure does not satisfy the statistical relevance measure threshold, adopting the per-inference universal machine learning model data object as the respective global machine learning model data object for the selected inference identifier.

16. The apparatus of claim 13, wherein the demographic-aware predictive data analysis API is configured to:
   receive a predictive inference query sent from a first model data object provider agent;
   identify a query-related subset of plurality of global machine learning model data objects that are associated with the predictive inference query;
   process the predictive inference query in accordance with the query-related subset to generate a per-model data object predictive inference output; and
   provide the per-model data object predictive inference output to the first model data object provider agent.

17. The apparatus of claim 16, wherein identifying the query-related subset for the predictive inference query comprises:
   identifying an inferred inference identifier associated with the predictive inference query;
   identifying a related model provider demographic profile associated with the first model data object provider agent; and
   identifying the query-related subset based at least in part on each of the respective global machine learning model data object associated with (i) the inferred inference identifier and (ii) a related model provider demographic profile of the one or more related model provider demographic profiles.

18. A computer program product comprising at least one non-transitory computer-readable storage medium having computer-readable program code portions stored therein, the computer-readable program code portions configured to:
   receive a plurality of local machine learning model data objects, wherein each local machine learning model data object of the plurality of local machine learning model data objects is (i) received from a respective model data object provider agent of a plurality of model data object provider agents, (ii) associated with a respective inference identifier of a plurality of inference identifiers, (iii) associated with a respective model provider demographic profile of a plurality of model provider demographic profiles comprising demographic data of the respective model data object provider agent is received, wherein the plurality of model data object provider agents is mapped in a multi-dimensional space based at least in part on the plurality of model provider demographic profiles;
   for each selected local machine learning model data object comprising a selected inference identifier and a selected model provider demographic profile, generate a respective global machine learning model data object based at least in part on a plurality of related local machine learning model data objects of the plurality of local machine learning model data objects, wherein (i) each related local machine learning model data object of the plurality of related local machine learning model data objects is associated with the selected inference identifier and the selected model provider demographic profile, (ii) the selected local machine learning model data object is selected based at least in part on a mapping of the multi-dimensional space, and (iii) the selected inference identifier is associated with a per-inference universal machine learning model data object associated with a per-inference statistical relevance measure; and
   provide, based at least in part on each of the respective global machine learning model data object, a demographic-aware predictive data analysis application programming interface (API) that is accessible by the plurality of model data object provider agents.

19. The computer program product of claim 18, wherein generating the respective global machine learning model data object for each selected local machine learning model data object comprises:
   generating the per-inference universal machine learning model data object and a universal model provider demographic profile,
   determining the per-inference statistical relevance measure for the per-inference universal machine learning model data object,
   determining whether the per-inference statistical relevance measure satisfies a statistical relevance measure threshold,
   in response to determining that the per-inference statistical relevance measure satisfies the statistical relevance measure threshold: (i) generating a per-inference-per-profile global machine learning model data object associated with (1) the selected inference identifier and (2) a non-universal model provider demographic profile, and (ii) adopting the per-inference-per-profile global machine learning model data object and the per-inference universal machine learning model data object as the respective global machine learning model data object for the selected inference identifier; and
   in response to determining that the per-inference statistical relevance measure does not satisfy the statistical relevance measure threshold, adopting the per-inference universal machine learning model data object as the respective global machine learning model data object for the selected inference identifier.

20. The computer program product of claim 19, wherein the demographic-aware predictive data analysis API is configured to:
   receive a predictive inference query sent from a first model data object provider agent;
   identify a query-related subset of plurality of global machine learning model data objects associated with the predictive inference query;
   process the predictive inference query in accordance with the query-related subset to generate a per-model data object predictive inference output; and
   provide the per-model data object predictive inference output to the first model data object provider agent.

* * * * *